(12) United States Patent
Chakravarty et al.

(10) Patent No.: US 11,348,278 B2
(45) Date of Patent: May 31, 2022

(54) OBJECT DETECTION

(71) Applicant: Ford Global Technologies, LLC, Dearborn, MI (US)

(72) Inventors: Punarjay Chakravarty, Campbell, CA (US); Shubham Shrivastava, Sunnyvale, CA (US); Gaurav Pandey, College Station, TX (US); Xue Iuan Wong, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/016,874

(22) Filed: Sep. 10, 2020

(65) Prior Publication Data
US 2022/0076441 A1   Mar. 10, 2022

(51) Int. Cl.
| *G06T 7/73* | (2017.01) |
| *G06T 3/40* | (2006.01) |
| *G01S 13/42* | (2006.01) |
| *G01S 17/42* | (2006.01) |
| *G01S 17/86* | (2020.01) |
| *G01S 13/86* | (2006.01) |

(52) U.S. Cl.
CPC .................. *G06T 7/73* (2017.01); *G06T 3/40* (2013.01); *G01S 13/42* (2013.01); *G01S 13/867* (2013.01); *G01S 17/42* (2013.01); *G01S 17/86* (2020.01); *G06T 2207/10028* (2013.01); *G06T 2207/30204* (2013.01); *G06T 2207/30244* (2013.01); *G06T 2207/30256* (2013.01)

(58) Field of Classification Search
CPC ... G06T 7/73; G06T 3/40; G06T 2207/10028; G06T 2207/30204; G06T 2207/30244; G06T 2207/30256
See application file for complete search history.

(56) References Cited

U.S. PATENT DOCUMENTS

| 9,201,424 B1 | 12/2015 | Ogale |
| 9,563,951 B2 | 2/2017 | Okouneva |
| 9,804,594 B2 | 10/2017 | Gariepy et al. |
| 9,986,233 B1 | 5/2018 | Curlander et al. |

(Continued)

*Primary Examiner* — Myron Wyche
(74) *Attorney, Agent, or Firm* — Frank A. MacKenzie; Bejin Bieneman PLC

(57) ABSTRACT

A computing device is programmed to generate a plurality of raw 3D point clouds from respective sensors having non-overlapping fields of view, scale each of the raw point clouds including scaling real-world dimensions of one or more features included in the respective raw 3D point cloud, determine a first transformation matrix that transforms a first coordinate system of a first scaled 3D point cloud of a first sensor to a second coordinate system of a second scaled 3D point cloud of a second sensor, and determine a second transformation matrix that transforms a third coordinate system of a third scaled 3D point cloud of a third sensor to the second coordinate system of the second scaled 3D point cloud of the second sensor. The computing device is programmed, based on the first and second transformation matrices, upon detecting an object in a first or third camera field of view, determine location coordinates of the object relative to a coordinate system that is defined based on the second coordinate system; and output the determined location coordinates of the object.

16 Claims, 10 Drawing Sheets

(56) References Cited

U.S. PATENT DOCUMENTS

| | | |
|---|---|---|
| 10,430,970 B2 | 10/2019 | Bier |
| 2017/0299404 A1* | 10/2017 | Wang ........................ G06T 7/80 |
| 2019/0295266 A1* | 9/2019 | Fan ........................... G06T 7/38 |
| 2020/0160546 A1* | 5/2020 | Gu ........................... G06N 3/08 |
| 2020/0211226 A1* | 7/2020 | Kundu ............... G06K 9/00818 |

* cited by examiner

OBJECT DETECTION

BACKGROUND

One or more computers in an autonomous vehicle (or self-driving car) can be programmed to navigate and operate the vehicle based on vehicle sensor data. The vehicle computers may rely on sensor data, e.g., camera data, etc., to detect objects. Different sensors can provide data from different fields of view. Fusion of data from multiple sensors is a technical challenge.

DETAILED DESCRIPTION

Introduction

Figure 1:
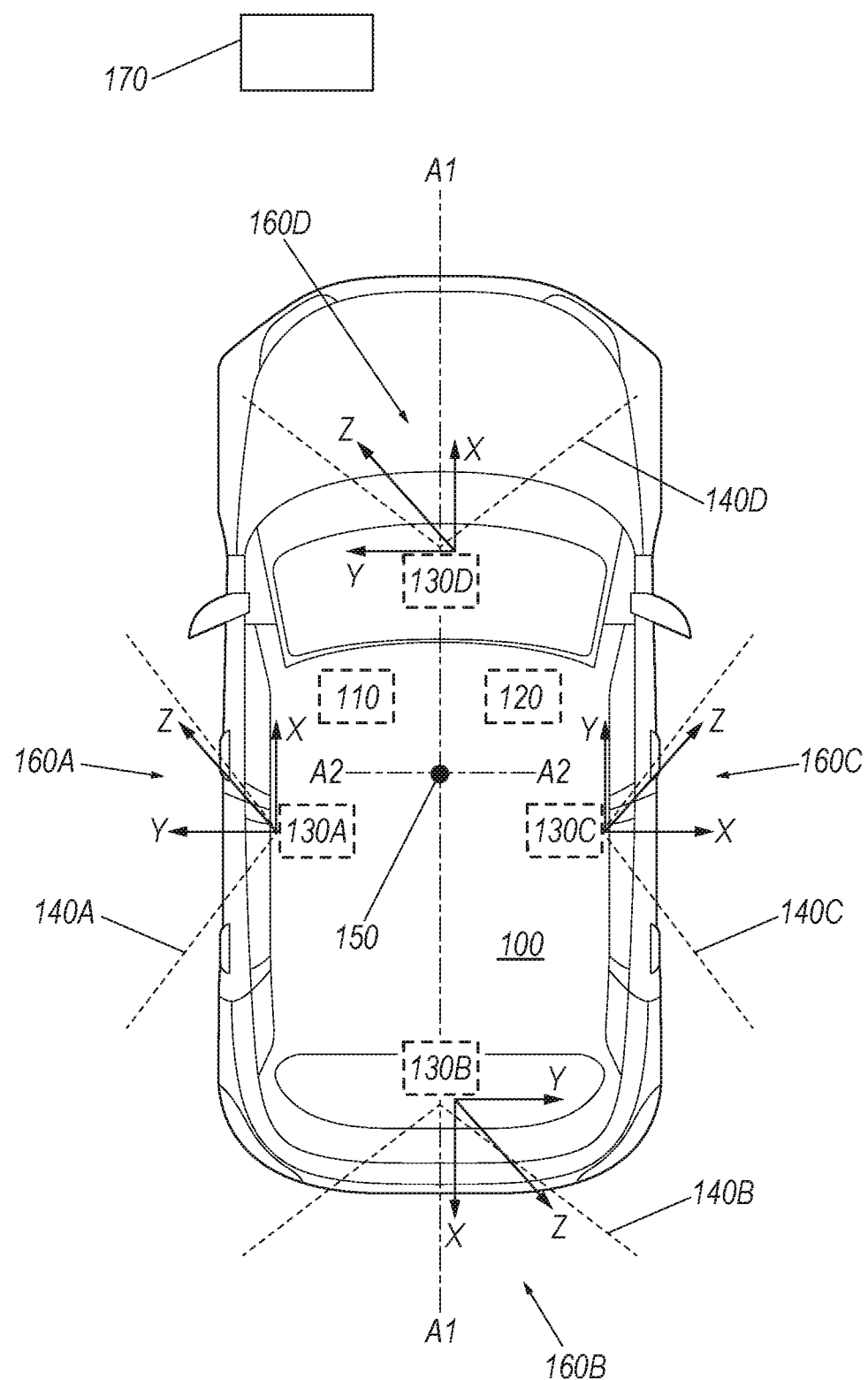
FIG. 1 is a block diagram showing an example vehicle including sensors detecting an object.

Disclosed herein is a computing device comprising a processor and a memory. The memory stores instructions executable by the processor to generate a plurality of raw 3D point clouds from respective sensors having non-overlapping fields of view, to scale each of the raw point clouds including scaling real-world dimensions of one or more features included in the respective raw 3D point cloud, and to determine a first transformation matrix that transforms a first coordinate system of a first scaled 3D point cloud of a first sensor to a second coordinate system of a second scaled 3D point cloud of a second sensor. The memory stores instructions to determine a second transformation matrix that transforms a third coordinate system of a third scaled 3D point cloud of a third sensor to the second coordinate system of the second scaled 3D point cloud of the second sensor, based on the first and second transformation matrices, upon detecting an object in a first or third camera field of view, to determine location coordinates of the object relative to a coordinate system that is defined based on the second coordinate system, and to output the determined location coordinates of the object.

The instructions may further include instructions to generate the raw 3D point clouds by applying monocular visual odometry technique to image data received from the respective sensor.

Each of the plurality of 3D point clouds may be generated based on data received from one of a plurality of sensors.

The one or more features may include at least one of a lane marking, a guardrail, a traffic sign, and a traffic light, and wherein the real-world dimensions may be determined based on at least one of (i) received HD map data or (ii) a set of specified dimensions including distances between two or more road markings, and dimensions of the traffic sign.

The instructions may further include instructions to determine the first transformation matrix by matching one or more features between the first and second 3D point clouds from the plurality of scaled 3D point clouds, thereby determining a first sensor pose relative to a second sensor pose; the second coordinate system defined based on the second sensor pose.

The instructions may further include instructions to determine the second transformation matrix by matching one or more features between a third scaled 3D point cloud and the second scaled 3D point clouds from the plurality of raw 3D point clouds, thereby generating a third sensor pose relative to the second sensor pose; the second coordinate system defined based on the second sensor pose.

Further disclosed herein is a computing device comprising a processor and a memory. The memory stores instructions executable by the processor to receive a transformation matrix of each of a plurality of stationary fiducial markers at a plurality of locations, based on receiving image data from each of a plurality of sensors, each image including image data including at least one of the fiducial markers, to determine respective transformation matrices of a vehicle relative each of the fiducial markers, wherein each of the sensors is included on the vehicle and wherein the sensors have non-overlapping fields of view, to determine a relative transformation matrix of each of the sensors with respect to a vehicle coordinate system having an origin at a vehicle reference point, upon receiving the image data including an object from at least one of the sensors, to determine transformation matrix of the object relative to the vehicle coordinate system, and to actuate a vehicle actuator based on the object.

The instructions may further include instructions to determine the relative transformation matrix of each of the sensors with respect to the vehicle coordinate system by performing a pose concatenation.

The received transformation matrix of each of a plurality of stationary fiducial markers at a plurality of locations may be defined relative to a second coordinate system outside the vehicle, and each pose includes roll, pitch, yaw, lateral, longitudinal, and elevation coordinates.

Each of the fiducial markers may be an Aruco marker.

The instructions may further include instructions to determine transformation matrix of the object relative to a coordinate system that is defined based on a second coordinate system by performing a pose concatenation, wherein the pose concatenation is a result of a matrix dot product operation on a first matrix specifying object coordinates relative to a first camera and a second transformation matrix specifying a pose and coordinates of the first camera relative to the second coordinate system.

Further disclosed herein is a method, comprising generating a plurality of raw 3D point clouds from respective sensors having non-overlapping fields of view, scaling each of the raw point clouds including scaling real-world dimensions of one or more features included in the respective raw 3D point cloud, determining a first transformation matrix that transforms a first coordinate system of a first scaled 3D point cloud of a first sensor to a second coordinate system of a second scaled 3D point cloud of a second sensor, determining a second transformation matrix that transforms a third coordinate system of a third scaled 3D point cloud of a third sensor to the second coordinate system of the second scaled 3D point cloud of the second sensor, based on the first and second transformation matrices, upon detecting an object in a first or third camera field of view, determining location coordinates of the object relative to a coordinate system that is defined based on the second coordinate system, and outputting the determined location coordinates of the object.

The method may further include generating the raw 3D point clouds by applying monocular visual odometry technique to image data received from the respective sensor, wherein each of the plurality of 3D point clouds is generated based on data received from one of a plurality of sensors.

The one or more features may include at least one of a lane marking, a guardrail, a traffic sign, and a traffic light, and wherein the real-world dimensions are determined based on at least one of (i) received HD map data or (ii) a set of specified dimensions including distances between two or more road markings, and dimensions of the traffic sign.

The method may further include determining the first transformation matrix by matching one or more features between the first and second 3D point clouds from the plurality of scaled 3D point clouds, thereby determining a first sensor pose relative to a second sensor pose; the second coordinate system defined based on the second sensor pose.

The method may further include determining the second transformation matrix by matching one or more features between a third scaled 3D point cloud and the second scaled 3D point clouds from the plurality of raw 3D point clouds, thereby generating a third sensor pose relative to the second sensor pose; the second coordinate system defined based on the second sensor pose.

Further disclosed is a computing device programmed to execute any of the above method steps.

Yet further disclosed is a computer program product, comprising a computer readable medium storing instructions executable by a computer processor, to execute any of the above method steps.

System Elements

Navigation of a land vehicle, e.g., an autonomous or semi-autonomous vehicle, may be based on sensor data about objects, e.g., data including location(s), dimensions, types or classes, etc., of objects. A vehicle computer may receive data from multiple sensors from which objects may be detected and/or described, e.g., camera sensors, lidar (light imaging detection and ranging) sensors, etc., and operate the vehicle based on a result of fusing data received from multiple sensors. Data fusion means combining multiple data sources about a field of view, thereby taking advantage of data obtained via various sensed media, and typically providing more consistent, accurate, and useful information than that provided by any one of the data sources alone.

Problem can arise in fusing data from multiple sensors, e.g., where difference sensors are governed by different parameters, e.g., utilize different media, have different fields of view, etc. Even different sensors in a same medium can present data fusion problems due to differences between parameters, e.g., resolution of data, sensor field of view, etc. For example, a vehicle computer may detect an object in a first location with first dimensions based on data from a first camera, while detecting the object in a second location with second dimensions different from the first location and/or the first dimensions based on data received from a second camera. Fusing data from such first and second cameras to present reliable data about an object with respect to a vehicle present challenges.

Advantageously as disclosed herein, to operate a vehicle based on data from multiple sensors, extrinsic calibration parameters can be determined. Extrinsic calibration parameters specify a transformation of coordinates (or transformation matrix) from a first sensor coordinate system to a second sensor coordinate system.

To improve sensor data fusion and provide more efficient and accurate recognition and description of objects and/or an environment, a computer may be programmed to generate a plurality of raw 3D point clouds from respective 2D image sensors having non-overlapping fields of view, and to scale each of the raw point clouds, including scaling real-world dimensions of one or more features included in the respective raw 3D point cloud. The computer may be programmed to determine a first transformation matrix that transforms a first coordinate system of a first scaled 3D point cloud of a first sensor to a second coordinate system of a second scaled 3D point cloud of a second sensor. The computer may be further programmed to determine a second transformation matrix that transforms a third coordinate system of a third scaled 3D point cloud of a third sensor to the second coordinate system of the second scaled 3D point cloud of the second sensor. The computer may be further programmed, based on the first and second transformation matrices, upon detecting an object in a first or third camera field of view, to determine location coordinates of the object relative to a coordinate system that is defined based on the second coordinate system, and to output the determined location coordinates of the object. A transformation matrix includes (i) pose (roll, pitch, and heading) and (ii) location coordinates (lateral, longitudinal, and elevation) of an object or coordinate system relative to another coordinate system. A "feature" in or of an environment, in the present context, means a physical structure in the environment, i.e., a physical object, surface, or marking, e.g., a building, pole, traffic sign, bridge, road surface, vegetation, guardrail, and/or patterns or markings physically applied to other physical structures in the environment, e.g., a painted lane marking, etc.

FIG. 1 illustrates an example host vehicle 100 including a computer 110, actuator(s) 120, and multiple object detection sensors such as camera sensors 130A, 130B, 130C, 130D with fields of view 140A, 140B, 140C, 140D. In the present context, a camera sensor 130 with a field of view 140 may be any of the example camera sensors 130A, 130B, 130C, 130D with a respective field of view 140A, 140B, 140C, 140D. In one example shown in FIG. 1, the camera sensors 130A, 130B, 130C, 130D may be directed to left, rear, right, and front direction of the vehicle 100.

In one example, as shown in FIG. 1, the camera sensors 130 may be mounted within a predetermined distance, e.g., 10 centimeter (cm), from one another in different directions. A reference point such as a geometrical center point 150 can be specified for a vehicle 100, e.g., a point at which respective longitudinal and lateral centerlines of the vehicle 100 intersect. A vehicle 100 body may have a longitudinal axis A1 and one or more lateral axes A2. The vehicles 100 may be powered in a variety of known ways, e.g., with an electric motor and/or internal combustion engine.

The computer 110 (or computing device) includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode, the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., the sensors 130, actuators 120, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

The actuators 120 may be implemented via circuits, chips, or other electronic components that can actuate various vehicle subsystems in accordance with appropriate control signals as is known. The actuators 120 may be used to control braking, acceleration, and steering of the vehicle 100. As an example, the vehicle 100 computer 110 may output control instructions to control the actuators 120.

The vehicle 100 sensors 130 may provide data encompassing at least some of an exterior of the vehicle 100, e.g., a camera, radar, and/or lidar (light imaging detection and ranging). For example, a camera sensor 130 may provide object detection, i.e., data including dimensions, relative location, etc., of objects 170 outside the vehicle 100 within a field of view 140 of the sensor 130. For example, locations relative to a vehicle 100 can be specified with respect to two or three axes of a three-dimensional Cartesian coordinate system 160, e.g., according to (x, y, z) coordinates. The coordinate system 160 may be a Cartesian coordinate system in an origin such as a point on or in the respective sensor 130. In one example, each coordinate system 160 has an origin at a specified point, e.g., a center of a lens, a geometrical center, etc., of the respective sensor 130.

A reference point 150, e.g., an intersection of the longitudinal axis A1 and a lateral axis A2 could be at a reference location with defined with respect to the vehicle 100. The computer 110 may be programmed to determine the location, dimensions, etc., of an object 170 within a field of view 140 of a specific sensor 130 based on data received from the camera sensor 130 relative to the respective coordinate system 160 defined with respect to the sensor 130.

A camera sensor 130 provides image data to, e.g., the vehicle 100 computer 110. The camera sensor(s) may include chips, image sensors, and optical components. The camera sensor(s) 130 may output image data based on the optical signals captured by the image sensor(s) of the camera sensor 130. The computer 110 may be programmed to detect object(s) 170 from image data received from the camera sensor(s) 130 and determine dimension(s) and/or location of the object(s) 170, e.g., with respect to the coordinate system 160 of the respective sensor 130.

Object(s) 170 may be a second vehicle, bicycle, truck, pedestrian, building, traffic sign, wall, light pole, etc., within a field of view 140 of a respective sensor 130. An object 170 is a real-world, i.e., physical, object. Real-world data about an object 170 is herein referred to as ground truth data. That is, ground truth data is data that sensors 130 would obtain if sensors 130 were perfect and could provide a perfect, true representation of an environment without any errors or lags in communication or measurement. It is desirable for sensors 130 to provide data from which a computer 110 can determine data representing an object 170 that is as close to ground truth data as possible (i.e., a best possible approximation of real-world object. Further, in the present context, a field of view 140 is an area of the ground surface (e.g., the horizontal plane 210) in which objects 170 can be detected by the sensors 130.

The fields of view 140 of sensors 130 can be non-overlapping, as in examples herein. "Non-overlapping" fields of view mean that (i) no portion of an environment exterior to the vehicle 100 is included in data received from more than one sensor 130, or (ii) a portion of the environment exterior to the vehicle 100 is present in data from two sensors 130, but an object 170 within the portion of the environment detected by the two sensors 130 is detectable based on data from only one of the two sensors 130. In other words, fields of view of sensors 130 are considered to be non-overlapping when any two sensors 130 provide data from an overlapping area but the amount of the data (e.g., width angle of overlapping area) from the overlapping area is insufficient for one of the sensors to detect an object 170 independently from data from at least the other sensor 130. For example, a horizontal width angle of overlapping area may be 5 degrees with respect to a reference line on the ground surface. Thus, an object 170 may not fit in the overlapping area of the image data, and therefore the computer 110 may lack the ability to detect the object 170 only based on the image data of the overlapping area.

The computer 110 may be programmed to operate the vehicle 100 based on data received from the vehicle 100 sensor(s) 130. The computer 110 may be programmed to actuate a vehicle 100 actuator 120, e.g., to operate braking, steering, and/or propulsion, based on the received sensor 130 data.

The computer 110 can be programmed to generate a plurality of raw 3D (three-dimensional) point clouds from respective sensors 130 having non-overlapping fields of view 140. A 3D point cloud is a 3D representation of an environment formed by acquiring distance or range measurements between an object detection sensor 130 and points in an environment (e.g., using techniques such as discussed further below), typically including data points describing objects 170 and/or surfaces, e.g., a road surface detected based on data received from an object detection sensor 130. A 3D point cloud includes 3D location coordinates of points on surfaces of object(s) 170, road, etc. In the present context, a "raw" 3D point cloud specifies a representation of a 3D environment, e.g., an exterior of the vehicle 100 including any objects in the environment. The raw 3D point cloud is unscaled, i.e., lacks reference to real-world dimensions of objects 170 (i.e., e.g., a real-world, i.e., actual physical, length or width of an object 170). A scale, in this context, is a ratio of real-world distances compared to point cloud distances, e.g., specified in pixels. For example, a scale may specify that 1 pixel corresponds to 10×10 square centimeters (cm$^2$). "Scaling" means determining a ratio between real-world dimensions and dimensions of the point cloud.

For example, the computer 110 may generate a first raw 3D point cloud based on data received from the first sensor 130A, a second raw 3D point cloud based on data received from the second sensor 130B, a third raw 3D point cloud based on data received from the third sensor 130C, and a fourth raw 3D point cloud based on data received from the fourth sensor 130D. Data received from a camera sensor 130 is typically 2D (two-dimensional). Techniques such as a Visual Odometry (VO), bundle adjustment, etc., may be used to generate the raw 3D point clouds based on, e.g., grayscale 2D, data received from each of the camera sensor 130. In other words, each raw 3D point cloud is generated based on data from one of the camera sensors 130.

In monocular Visual Odometry, features such as object(s) 170 are detected in a camera sensor 130 field of view 140, and while the camera sensor 130 moves, e.g., based on a vehicle 100 movement, the detected features are matched over time. As discussed below with respect to FIGS. 4B, 5B, and 6, this process is referred to "matching," i.e., finding images of a same feature in images from different cameras. "Matching over time" means finding a feature in a first image at a time $t_1$ and then finding same feature viewed from a different field of view in a second image captured at time $t_2$. The computer 110 may be programmed to triangulate according to a parallax technique between a first position of the camera sensor 130, a second position of the camera sensor 130, and a position of a feature. A "parallax," as will be understood, is a displacement or difference in an apparent position of an object viewed along two different lines of sight. The term "monocular," in the present context, refers to use of only one camera sensor 130 to provide data in generating the raw 3D point cloud. For example, the computer 110 may be programmed, based on Equation (1) below, to estimate a relative location t and a relative pose R between different positions of a camera sensor 130 by minimizing an error E of point to point projection between the images received from the camera sensor 130.

$$E = \min_{R_i, t_i, X_j} \sum \|u_{i,j} - \prod(R_i X_j + t_i)\|^2 \quad (1)$$

A pose R specifies roll, pitch, and yaw of an object relative to a reference coordinate system. In one example, a pose R can specify a roll, pitch, and yaw of a first coordinate system relative to a second coordinate system. Thus, a pose R is an orthonormal rotation matrix parametrized by the Euler angles $[\varphi, \theta, \psi]^T$. Parameters $\varphi, \theta, \psi$ represent an angle between the coordinate system 160A, 160B, i.e., a roll, pitch, and heading respectively. The location parameter $t=[x, y, z]^T$ is a translation vector that provides a translation between the first and second locations of the coordinate system 160 of the camera sensor 130. Vectors u represent 2D features, e.g., object(s) 170, based on image pixel locations. For example, vector u[i,j] represent image plane position of features, wherein i and j are row and column coordinates of a feature. Additionally or alternatively, a feature may be a corner feature, a SIFT (scale-invariant feature transform), a SURF (speeded up robust features), and/or any other kind of learned feature which may be tracked frame to frame. Vector X represent 3D location of the features.

Figure 2:
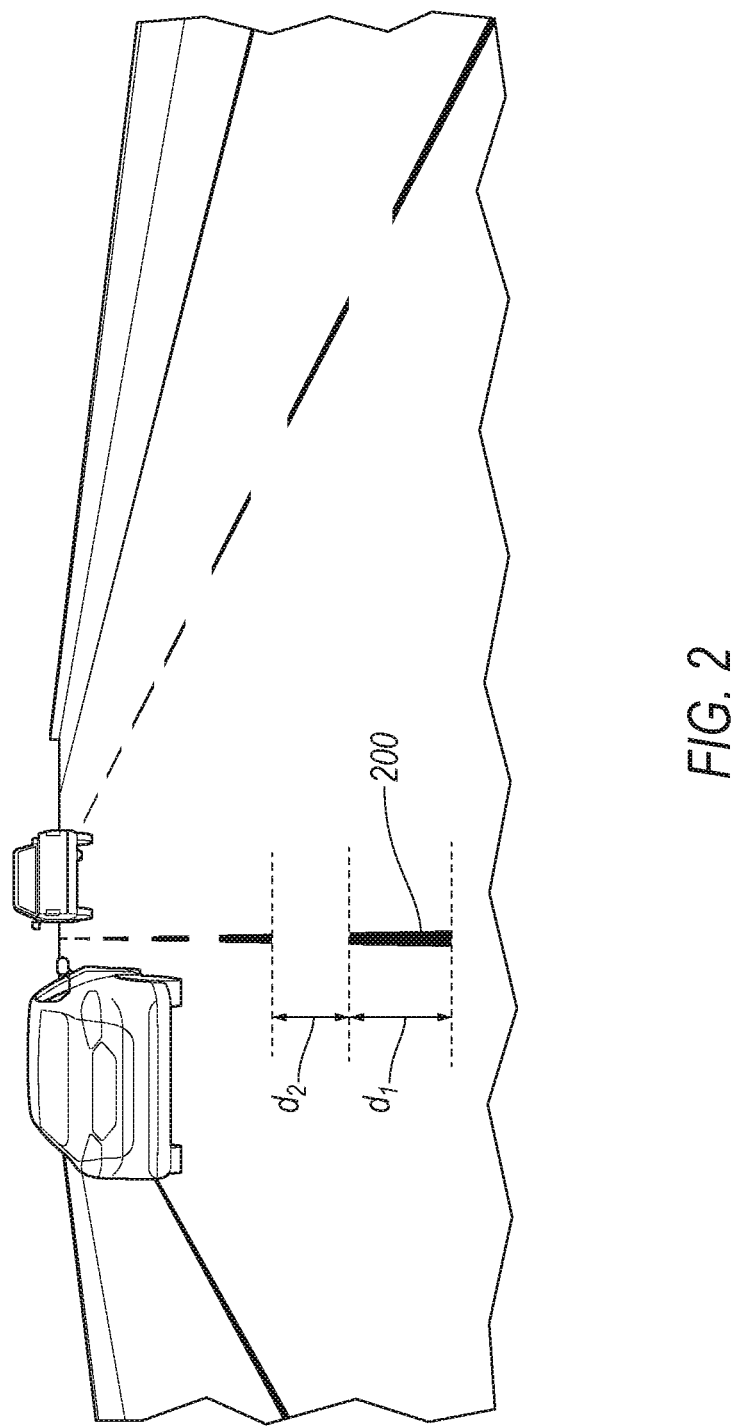
FIG. 2 is an example image received from a camera sensor of the vehicle of FIG. 1.
Figure 3:
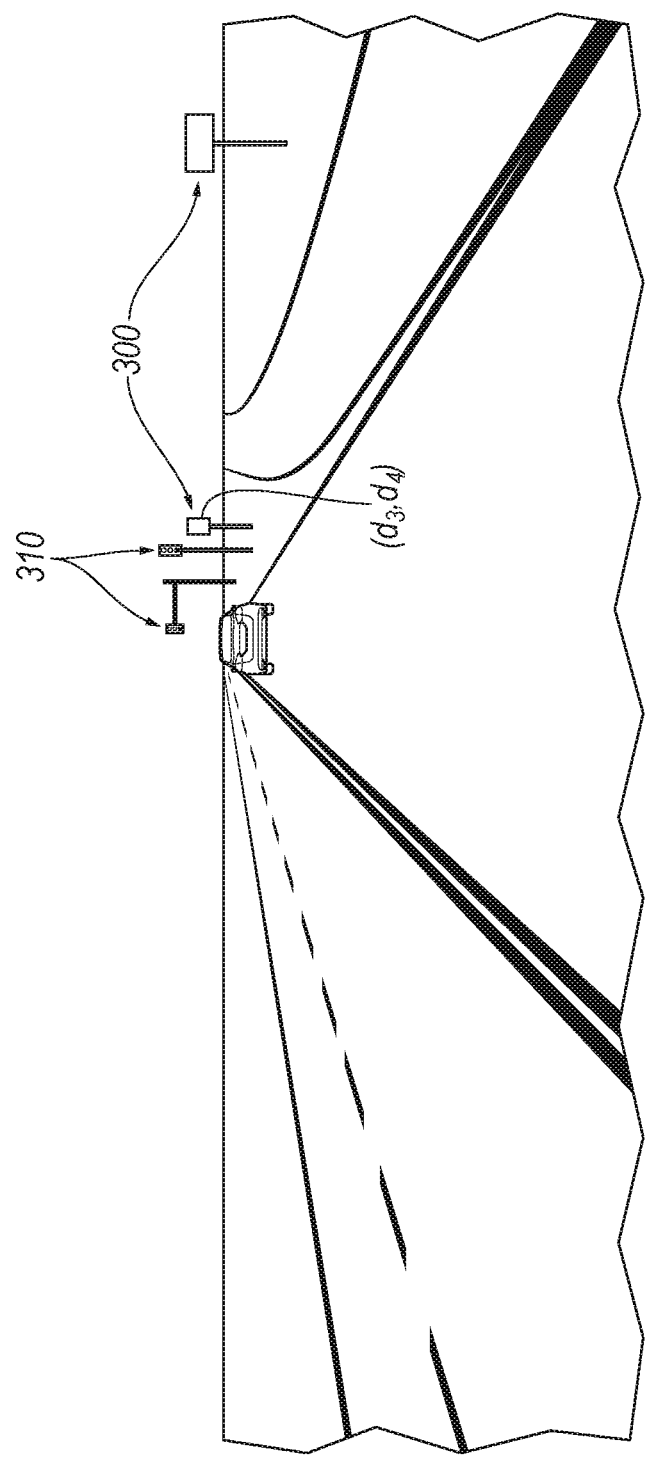
FIG. 3 is another example image received from the camera sensor showing dimensions determined from HD (High Definition) map data.

As discussed above, the raw 3D point cloud lacks a scale, i.e., a reference to dimensions of the real (i.e., physical) world. With reference to FIGS. 2-3, the computer 110 can be programmed to scale each of the raw 3D point clouds including scaling real-world dimensions of one or more features included in the respective raw 3D point cloud. The computer 110 may be programmed to generate a scaled 3D point cloud by scaling raw 3D map data. A scaled 3D point cloud includes information specifying a scale of the point cloud. A feature may be a lane marking 200 (FIG. 2), a guardrail, a traffic sign 300, and a traffic light 310. Upon scaling a raw 3D point cloud, the coordinate system 160 of the 3D point cloud is unchanged.

In one example, the computer 110 may be programmed to receive a set of specified dimensions including a length $d_1$ of a lane marking 200, respective distances $d_2$ between one or more sets of two road markings 200, and dimensions $d_3$, $d_4$ of the traffic sign 300, etc. The computer 110 may be programmed to store the set of specified dimensions in a computer 110 memory. Additionally or alternatively, the computer 110 may be programmed to determine real-world dimensions based on data received from a remote computer and/or a location of the vehicle 100, e.g., local guidelines for dimensions or road signs, markings, etc.

In another example, with reference to FIG. 3, the computer 110 may be programmed to receive 3D map data, e.g., an HD (High Definition) map, including dimensions of features such as traffic signs 300, traffic lights 310, road marking 200, etc. The computer 110 may then scale a feature of a raw 3D map by detecting a corresponding feature in the received HD map data and determining the dimensions of the feature based on the HD map data.

As discussed above, the scaled 3D point clouds have different coordinate systems 160, e.g., each having an origin at a point on or in the respective camera sensor 130. Upon each point cloud's scale being determined, a comparison of same features, e.g., a traffic sign, between data captured by different camera sensors 130 (as discussed below with reference to FIGS. 4B, 5B, and 6) may be used to determine a respective pose of each camera sensor 130 relative to a reference camera, e.g., the camera sensor 130.

The computer 110 may be programmed to determine a first transformation matrix $T_{C_2}^{C_1}$ that transforms a first coordinate system 160A of a first scaled 3D point cloud of a first sensor 130A to a second coordinate system 160B of a second scaled 3D point cloud of a second sensor 130B, as discussed below with reference to FIGS. 4A-4B and 5A-5B.

Figure 4A:
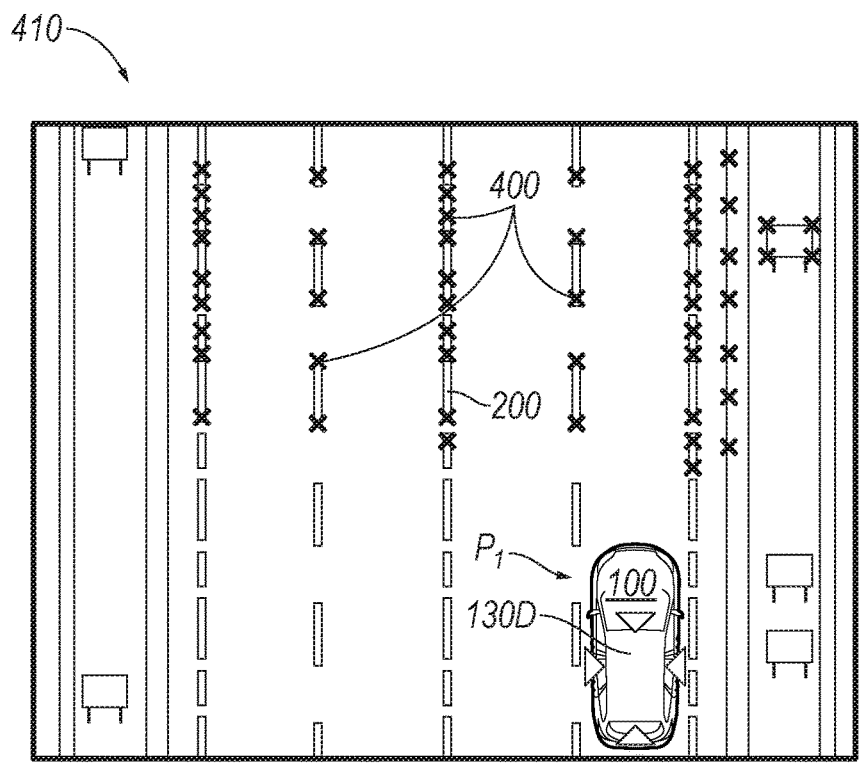
FIG. 4A illustrates a top view of a point cloud, generated from front camera sensor data, illustrating detected road feature points.

FIG. 4A shows a vehicle 100 in an area 410 having lane markings 200. FIG. 4A shows the vehicle 100 at a first location $P_1$ in the area 410. A location may be specified with GPS (global positioning system) location coordinates. The computer 110 may be programmed to identify lane markings 200 based on image data received from the camera sensor 130D. For example, the computer 110 may detect feature points 400, e.g., edges of the lane marking 200, within the field of view 140D of the front camera sensor 130D.

Figure 4B:
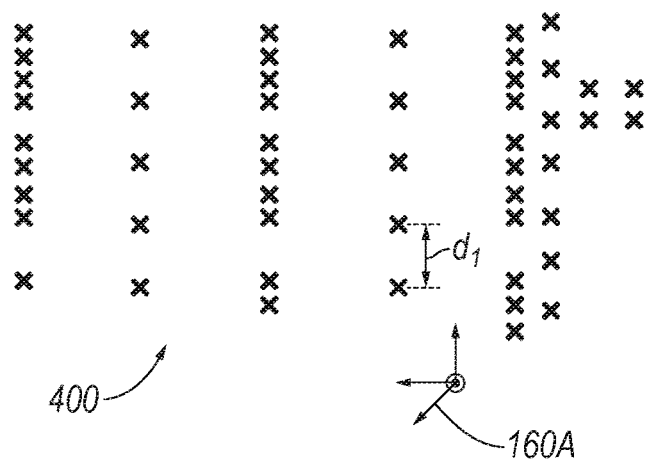
FIG. 4B illustrates the feature points of FIG. 4A.

FIG. 4B shows a top view of a scaled point cloud generated based on the detected feature points 400. The computer 110 may be programmed to determine a scale of the point cloud, as discussed above, based on known distances such as a length $d_1$ of the lane markings 200. Location coordinates of feature points 400 in the scaled point cloud illustrated by FIG. 4B are with respect to the coordinate system 160D of the sensor 130D.

Figure 5A:
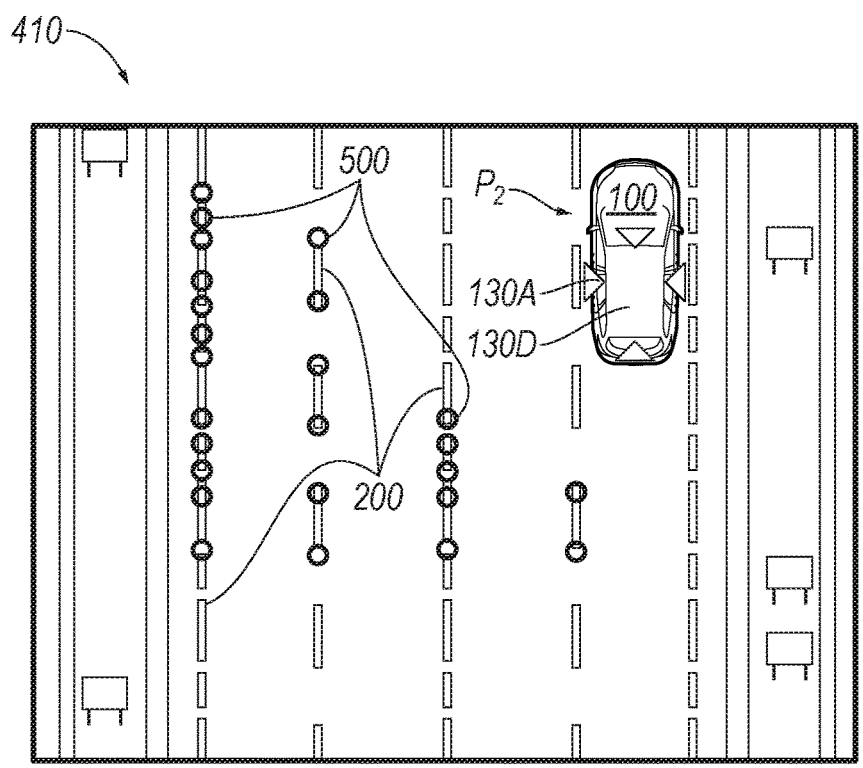
FIG. 5A illustrates a top view of another point cloud, generated from side camera sensor data, illustrating detected road feature points.

FIG. 5A shows the vehicle 100 moved to a second location $P_2$, e.g., 15 meters from the first location $P_1$ on a vehicle 100 path within a road lane. At the second location $P_2$, the computer 110 may detect feature points 500, based on the camera sensor 130D data. At least some of the feature points 400 (FIGS. 4A-4B), which were detected based on the data received from the sensor 130A when the vehicle 100 was at the first location $P_1$, will be included in the feature points 500 from the second location $P_2$. For example, as the vehicle 100 moves from the first location $P_1$ to the second location $P_2$, some of the feature points 400 detected by the front camera sensor 130D may be detected by side sensors 130A, and/or the rear sensor 130B as the feature points 500.

Figure 5B:
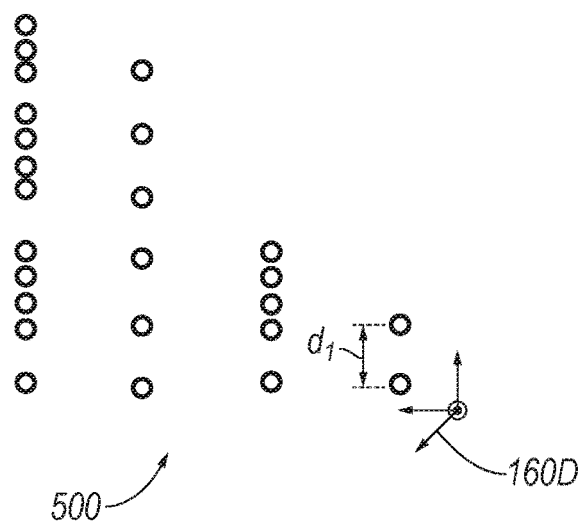
FIG. 5B illustrates the feature points of FIG. 5A.

FIG. 5B shows a top view of a second scaled 3D point cloud generated based on the feature points 500 detected within the field of view 140D. The computer 110 may be programmed to determine the scale of the 3D point cloud, as discussed above, based on known distances such a length $d_1$ of the lane markings 200. Location coordinates of the feature points 500 are with respect to the coordinate system 160B.

Figure 6:
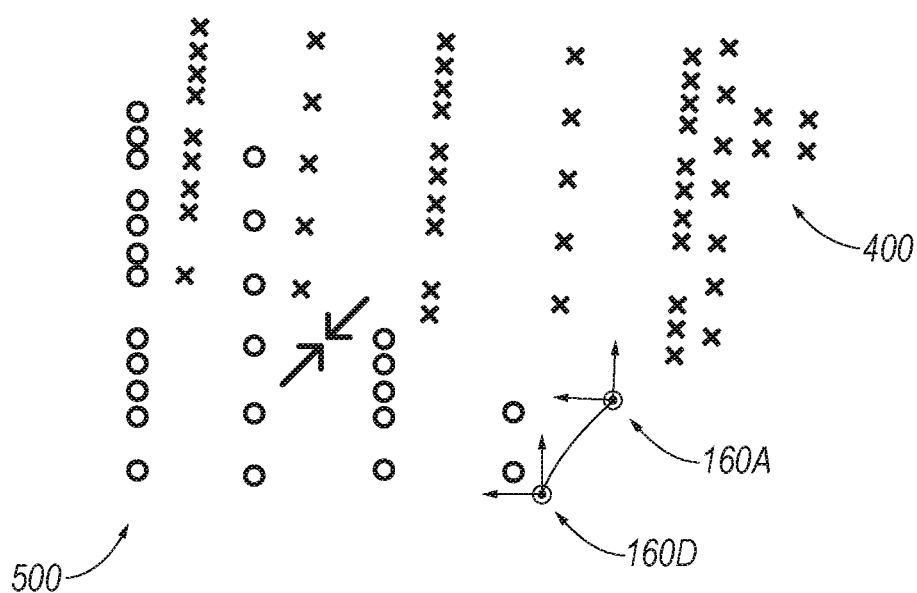
FIG. 6 illustrates an example of matching feature points of FIGS. 4B and 5B.

With reference to FIGS. 4B, 5B, and 6, the computer 110 can be programmed to determine the first transformation matrix $T_{C_2}^{C_1}$ by "matching" one or more features 400, 500 between the first and second 3D point clouds from the plurality of scaled 3D point clouds, thereby determining a first sensor pose R and location translation t relative to a second sensor 130, represented as a relative transformation matrix $T_{C_2}^{C_1}$. In the present context, "matching" means recognizing feature points 400 identified in the first scaled point cloud determined based on the sensor 130A data that correspond to feature points 500 identified in the second scaled point cloud determined based on the sensors 130 data.

As discussed above, poses R and locations t of different camera sensors 130 are different from one another. Thus, in identifying the matching feature points 400, 500, for example, a perspective transformation technique, e.g., Perspective-n-point (PnP) technique, etc., may be performed. A computer 110 may be programmed to identify feature points 400 of FIG. 4B and to perform (or compute) a homography or projective transformation to match feature points 500 in FIG. 5B. Thus, utilizing a homography technique, the computer 110 may be programmed to identify a projective transformation between the first and second feature points 400, 500, as discussed below.

In the present context, a "homography" or a "perspective transformation" is a line-preserving projective mapping of feature points 400, 500 observed from two different perspectives. "Line preserving" means that if multiple points are on a same line in the first point cloud shown in FIG. 4B, the matching feature points 500 are on a same line in the second point cloud shown in FIG. 5B. In other words, the homography provides a mathematical relationship, e.g., the transformation matrix $T_{C_2}^{C_1}$.

The computer 110 can be programmed to determine a second transformation matrix $T_{C_2}^{C_3}$ that transforms a third coordinate system 160C of a third scaled 3D point cloud of a third sensor 130C to the second coordinate system 160B of the second scaled 3D point cloud of the second sensor 130B, as discussed above with respect to the above example of determining the first transformation matrix $T_{C_2}^{C_1}$.

The computer 110 may be programmed, based on the first and second transformation matrices $T_{C_2}^{C_1}$, $T_{C_2}^{C_3}$, upon detecting an object 170 in a first or third camera field of view 140A, 140C, to determine location coordinates of the object 170 relative to a coordinate system that is defined based on the second coordinate system 160D, and to then output the determined location coordinates of the object 170. Additionally or alternatively, the computer 110 may be programmed to determine a transformation matrix $T_{C_2}^{O}$, of the object 170 relative to the coordinate system 160 of the second camera sensor 130B including a pose R and a location t of the object 170 relative to the coordinate system 160 of the second camera sensor 130B.

Equation (2) is based on a "dot matrix operation," such as is known. The computer 110 may detect the object 170 based on image data received from the sensor 130A having the coordinate system 160A. Thus, the computer 110 may be programmed to determine the transformation matrix $T_{C_1}^{O}$ of the object 170 with respect to the coordinate system 160A of the sensor 130A. $T_{C_1}^{O}$ represents coordinates and pose of the detected object 170 relative to the sensor 130A coordinate system 160A. $T_{C_2}^{O}$ represents coordinates of the detected object 170 relative to the coordinate system 160D. The computer 110 may be programmed, based on Equation (2), to determine the transformation matrix $T_{C_2}^{O}$ of the object 170 relative to the second coordinate system 160B using the stored transformation matrix $T_{C_2}^{C_1}$. The computer 110 may store a transfer function $[T_{C_2}^{C_1}]$ specifying a transformation of the sensor 130A relative to the sensor 130B, which may be determined using the same technique discussed with respect to FIG. 6.

$$[T_{C_2}^{O}] = [T_{C_2}^{C_1}][T_{C_1}^{O}] \qquad (2)$$

Figure 7A:
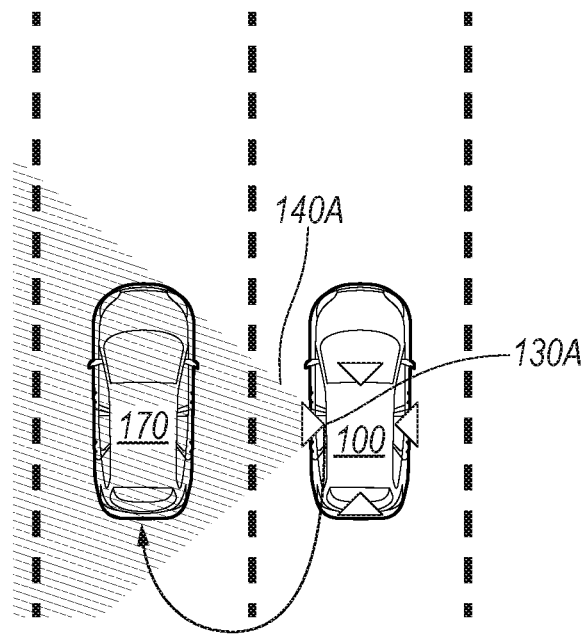
FIG. 7A shows an object within a side camera sensor field of view of the vehicle of FIG. 1.
Figure 7B:
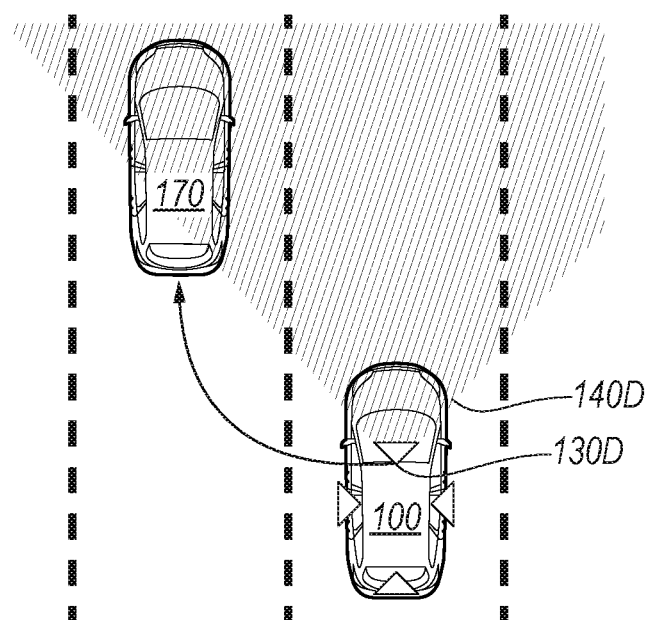
FIG. 7B shows the object of FIG. 7A within the field of view of the front camera sensor of the vehicle of FIG. 1.

Object(s) 170 may move relative to the vehicle 100 and therefore an object 170 may exit one sensor 130 field of view 140 and enter another sensor 130 field of view 140. FIGS. 7A-7B show the vehicle 100 and an object 170, e.g., a second vehicle, moving relative to the vehicle 100. With reference to FIG. 7A, the computer 110 may be programmed to detect the object 170 within a sensor 130A field of view 140A.

With respect to FIG. 7B, upon the object 170 exiting the field of view 140A and/or entering a field of view 140D, the computer 110 may determine the transformation matrix $[T_{C_4}^{O}]$ of the object 170 based on data received from the sensor 130D. The computer 110 may be programmed, e.g., implementing Equation (3) below, to determine the coordinate $[T_{C_2}^{O}]$ of the object 170 based on the transformation matrices $T_{C_4}^{O}$, $T_{C_2}^{C_1}$. In the present context, operation (3) may be referred to as pose concatenation. A pose concatenation is a result of a matrix dot product operation on a first matrix specifying object location and pose relative to a first camera and a second transformation matrix specifying a pose and location of the first camera relative to the second coordinate system.

$$[T_{C_2}^{O}] = [T_{C_2}^{C_4}][T_{C_4}^{O}] \qquad (3)$$

The computer 110 can determine the object 170 transformation matrix $[T_{C_1}^{O}]$ with respect to a reference field of view, e.g., the second field of view 140B, as the object 170 is in any of the fields of view 140, and to plan a path and/or operate the vehicle 100, i.e., actuate a vehicle 100 actuator 120, e.g., a steering, braking, and/or propulsion actuator 120, based on the detected object 170.

Figure 8:
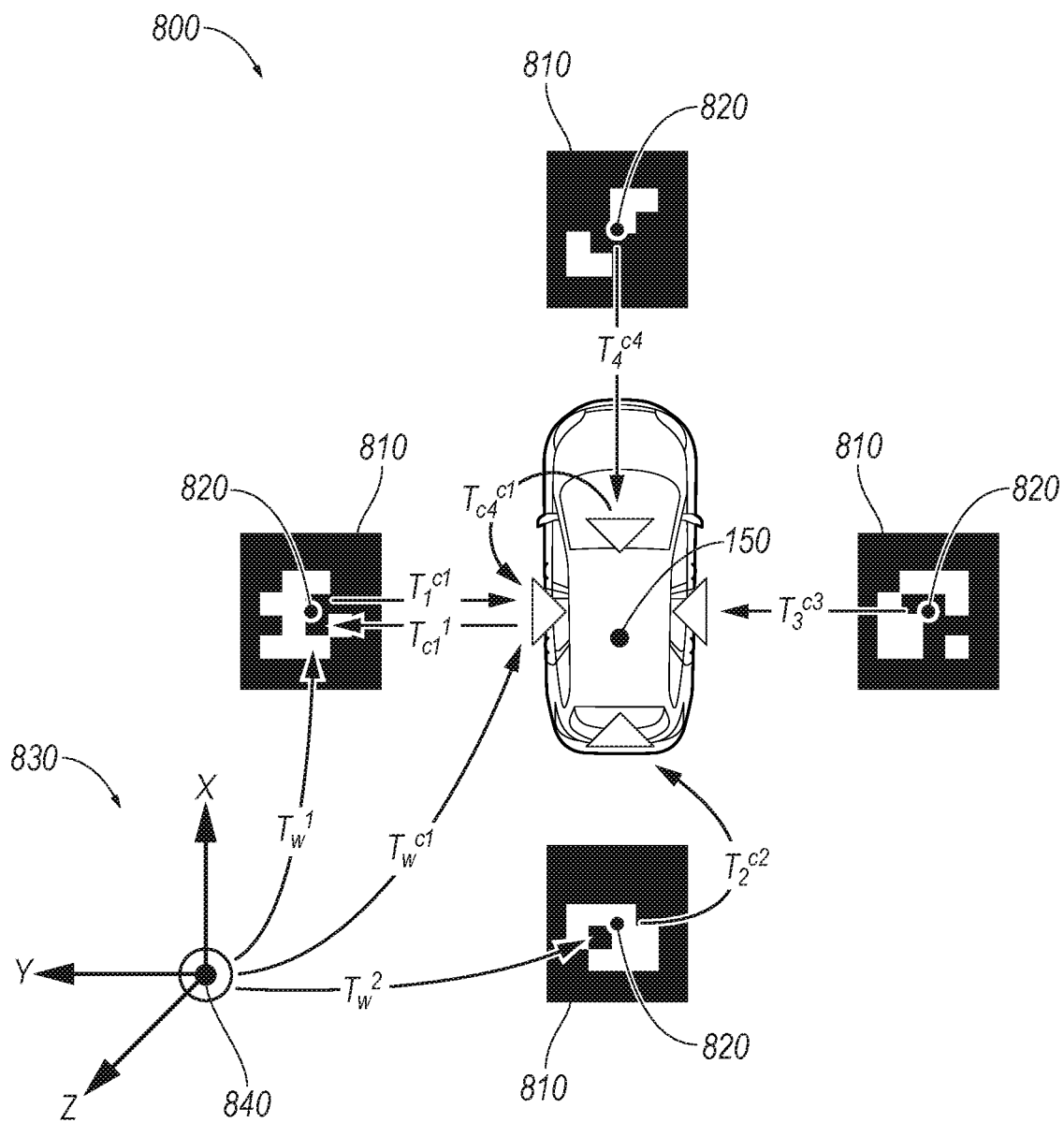
FIG. 8 shows the vehicle of FIG. 1 at a specified location with fiducial markers for extrinsic calibration.

FIG. 8 shows another example system for determining a pose of a sensor 130 relative to a point of origin different than the sensor 130 coordinate system 160, e.g., a reference point 150 in a vehicle 100. The vehicle 100 may be moved to and/or placed in at a specified area 800, e.g., in a manufacturing or service facility provided with fiducial markers 810. Multiple fiducial markers 810 may be placed in specified locations within the area 800.

A fiducial marker 810 is an object placed in the field of view 140 of a camera sensor 130, for use as a point of reference or a measurement. For example, a fiducial marker 810 can include a number of ArUco fiducial marks. ArUco fiducial marks are two-dimensional (2D) patterns from a library of fiducial marks described at www.uco.es/grupos/ava/node/26, "Aplicaciones de la Vision Artificial", University of Cordoba, Spain, May 15, 2019. ArUco fiducial marks are designed to be read by machine vision software that can determine a pose in pixel coordinates for each ArUco fiducial mark included in a fiducial marker 810 by processing a 2D (two-dimensional) image of the fiducial marker 810.

A fiducial maker 810 can be used to determine a pose of a vehicle 100 sensor 130 by displaying the fiducial marker 810 on a surface, e.g., on a ground surface, a wall, etc., in an environment, such as an area 800, that can be occupied by a vehicle 100. When the vehicle 100 is in the area 800 and a marker 810 is in a camera sensor 130 field of view 140, the computer 110 may determine a 3D pose of the fiducial marker 810, e.g., by using a machine vision technique.

The computer 110 can be programmed to receive a transformation matrix of each of a plurality of fiducial markers 810 at a plurality of locations within the area 800. For example, the computer 110 may be programmed to receive a transformation matrix $T_W^i$, e.g., i=1, 2, 3, 4, of a marker 810 relative to a reference coordinate system 830 with an origin 840, e.g., GPS coordinate system 830 with GPS origin point 840. In other words, the computer 110 may receive data that specify a transformation matrix $T_W^i$ of the markers 810 relative to the reference coordinate system 830. Table 1 shows an example set of relative transformation matrices as discussed below with respect to Equations (4)-(8).

TABLE 1

| Parameter | Description |
| --- | --- |
| $T_W^1$ | world to first marker transformation matrix |
| $T_W^2$ | world to second marker transformation matrix |
| $T_W^3$ | world to third marker transformation matrix |
| $T_W^4$ | world to fourth marker transformation matrix |
| $T_W^{C_1}$ | world to first camera sensor transformation matrix |
| $T_1^{C_1}$ | first marker to first camera sensor transformation matrix |
| $T_2^{C_2}$ | world to first marker transformation matrix |
| $T_{C_1}^1$ | first camera sensor to first marker transformation matrix |
| $T_{C_4}^{C_1}$ | fourth camera sensor to first camera sensor transformation matrix |
| $T_{C_X}^{C_Y}$ | $x^{th}$ camera sensor to $y^{th}$ camera sensor transformation matrix |

The computer 110 can be programmed, based on receiving image data from the sensors 130, each image including image data including at least one of the fiducial markers 810, to determine respective poses of respective vehicle 100 sensors 130 relative each of the fiducial markers 810. The various sensors 130 typically have non-overlapping fields of view 140. The computer 110 may be programmed to determine a transformation matrix $T_{C_1}^1$ of a first marker 810 relative to the sensor 130A coordinate system 160A.

For example, the computer 110 may be programmed to determine the transformation matrix $T_{C_1}^1$ of the first marker 810 relative to the sensor 130A using a convolutional neural network (CNN). A CNN is a software program that can be implemented on a computing device that can be trained to input an image of a marker 810 and output a transformation matrix $T_{C_1}^1$ of the marker 810 relative to the sensor 130A coordinate system 160A. A CNN includes a plurality of convolutional layers that extract hidden features from an input image of a vehicle 100 which are passed to a plurality of fully-connected layers that transform the hidden features into a vehicle 100 pose. A CNN can be trained to process a plurality of images of markers 810 to determine the transformation matrix $T_{C_1}^1$. The CNN is trained by inputting an image of a marker 810 captured by the vehicle 100 sensor 130A and backpropagating results to be compared with the ground truth pose to determine a loss function. Training the CNN includes determining parameters for convolutional and fully-connected layers that minimize the loss function. When trained, a CNN can input an image of the markers 810 received from the vehicle 100 sensors 130 and output a transformation matrix $T_{C_1}^1$. Backpropagation, short for "backward propagation of errors," is an algorithm for supervised learning of artificial neural networks using gradient descent. Given an artificial neural network and an error function, the algorithm calculates the gradient of the error function with respect to the neural network's weights. Ground truth data, i.e., data deemed to provide a best representation of the real world, for training the CNN may include a set of data including (i) image data of markers 810 and (ii) respective transformation matrix relative to the sensor used for generating the training data.

The computer 110 can be programmed, as discussed with reference to Equations (4)-(8), to determine a relative transformation matrix of each of the sensors 130 with respect to a vehicle 100 coordinate system, e.g., a vehicle 100 sensor 130 coordinate system 160B, or a vehicle 100 reference point 150, etc. The computer 110 may be programmed, upon receiving image data including a representation of an object 170 from at least one of the sensors 130, to determine transformation matrix of the object 170 relative to a vehicle 100 coordinate system, e.g., a coordinate system 160 at a sensor 130 location, and to actuate a vehicle 100 actuator 120 based on the detected object 170.

Equation (4) specifies an example transformation matrix including (i) a pose matrix $R_{3\times1}$ which is a rotation matrix including roll, pitch, and heading of a vehicle 100, and (ii) a location translation $T_{3\times1}$. The computer 110 may be programmed to implement Equation (5) to use an inverse matrix operation to calculate a transformation matrix of a first camera sensor 130 relative to a first marker 810 based on a determined transformation matrix of the first marker 810 relative to the first camera sensor 130. The computer 110 can be programmed to implement Equation (6) to determine a transformation matrix $T_W^{C_1}$ of a first camera sensor 130 relative to the coordinate system 830 based on a transformation matrix $T_W^1$ and a transformation matrix $T_1^{C_1}$.

$$T_{C_1}^1 = \begin{bmatrix} R_{3\times1} & T_{3\times1} \\ 0\ 0\ 0 & 1 \end{bmatrix} \quad (4)$$

$$T_{C_1}^1 = [T_1^{C_1}]^{-1} \quad (5)$$

$$T_W^{C_1} = [T_W^1][T_1^{C_1}] \quad (6)$$

The computer 110 may be programmed to determine a transformation matrix $T_{C_2}^O$ of the object 170 relative to a coordinate system that is defined based on the second coordinate system 160B by performing a pose concatenation, as discussed with respect to Equation (3).

As a generalized example, the computer 110 may be programmed to implement Equation (7) to determine a transformation matrix of an $x^{th}$ camera sensor 130 relative to a $y^{th}$ camera sensor 130 based on (i) a real-world $x^{th}$ marker 810 transformation matrix, and (ii) a real-world coordinate system 830 to the first camera sensor 130. For example, Equation (8) shows an example use of Equation (7) to determine an operation to calculate the transformation matrix for the fourth camera sensor 130 relative to the first camera sensor 130.

$$T_{C_X}{}^{C_Y} = [T_W{}^{C_X}]^{-1}[T_W{}^{C_Y}] \quad (7)$$

$$T_{C_4}{}^{C_1} = [T_W{}^{C_4}]^{-1}[T_W{}^{C_1}] \quad (8)$$

Figure 9:
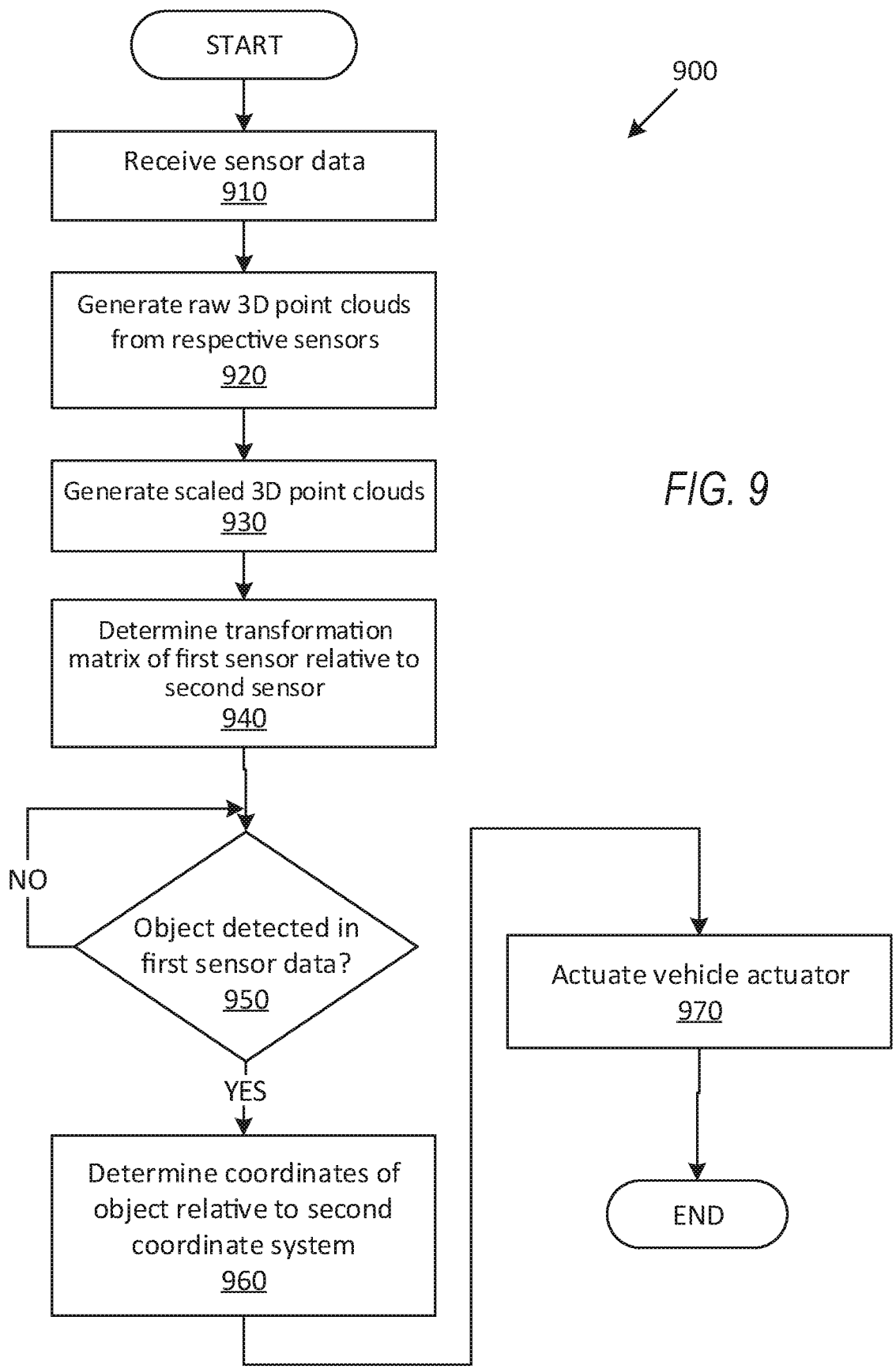
FIG. 9 is a flowchart of an example process for performing extrinsic calibration of vehicle camera sensors based on road features, and operating the vehicle.

FIG. 9 is a flowchart of an example process 900 for performing extrinsic calibration of vehicle 100 sensors 130 and operating the vehicle 100 using 3D point cloud data. The computer 110 may be programmed to execute blocks of the process 900.

The process 900 begins in a block 910, in which the computer 110 receives image data from the vehicle 100 camera sensors 130 with non-overlapping fields of view 140.

Next, in a block 920, the computer 110 generates raw 3D point clouds from respective sensors 130. The computer 110 may be programmed to utilize the Monocular VO technique, etc., to generate the raw 3D point clouds based on the received image data from the vehicle 100 sensors 130.

Next, in a block 930, the computer 110 scales each of the raw 3D point clouds, e.g., based on HD map data and/or specified dimensions $d_1$, $d_2$ of features, as discussed with respect to FIGS. 2-3.

Next, in a block 940, the computer 110 determines the transformation matrix $T_{C_2}{}^{C_1}$ of a first sensor 130 relative to second sensor 130. With reference to FIGS. 4A-4B and 5A-5B, the computer 110 may be programmed to identify feature points 400 based on the first scaled point cloud and the feature point 500 based on the second scaled 3D point cloud, and to determine the transformation matrix $T_{C_2}{}^{C_1}$ based on the identified matching feature points 400, 500.

Next, in a decision block 950, the computer 110 determines whether an object 170 is detected in the first sensor 130 field of view 140. If the computer 110 detects an object 170 in the field of view 140 of the first sensor 130, then the process 900 proceeds to a block 960; otherwise the process 900 returns to the decision block 950, or alternatively returns to the block 910, although not shown in FIG. 9.

In the block 960, the computer 110 determines the coordinates of the object 170 relative to a second coordinate system, e.g., the second sensor 130D coordinate system 160B, or a second coordinate system with an origin at a vehicle 100 reference point 150. As discussed with respect to Equation (3), the computer 110 may be programmed to determine a transformation matrix, including pose and coordinates, of the object relative to the second camera sensor 130D.

Following the block 960, in a block 970, the computer 110 actuates a vehicle 100 actuator 120 based on the identified coordinates t and/or pose R of the object 170 relative to the second coordinate system of the vehicle 100, e.g., with an origin at the second sensor 130D. Following the block 970, the process 900 ends, or alternatively returns to the decision block 950, although not shown in FIG. 9.

Figure 10:
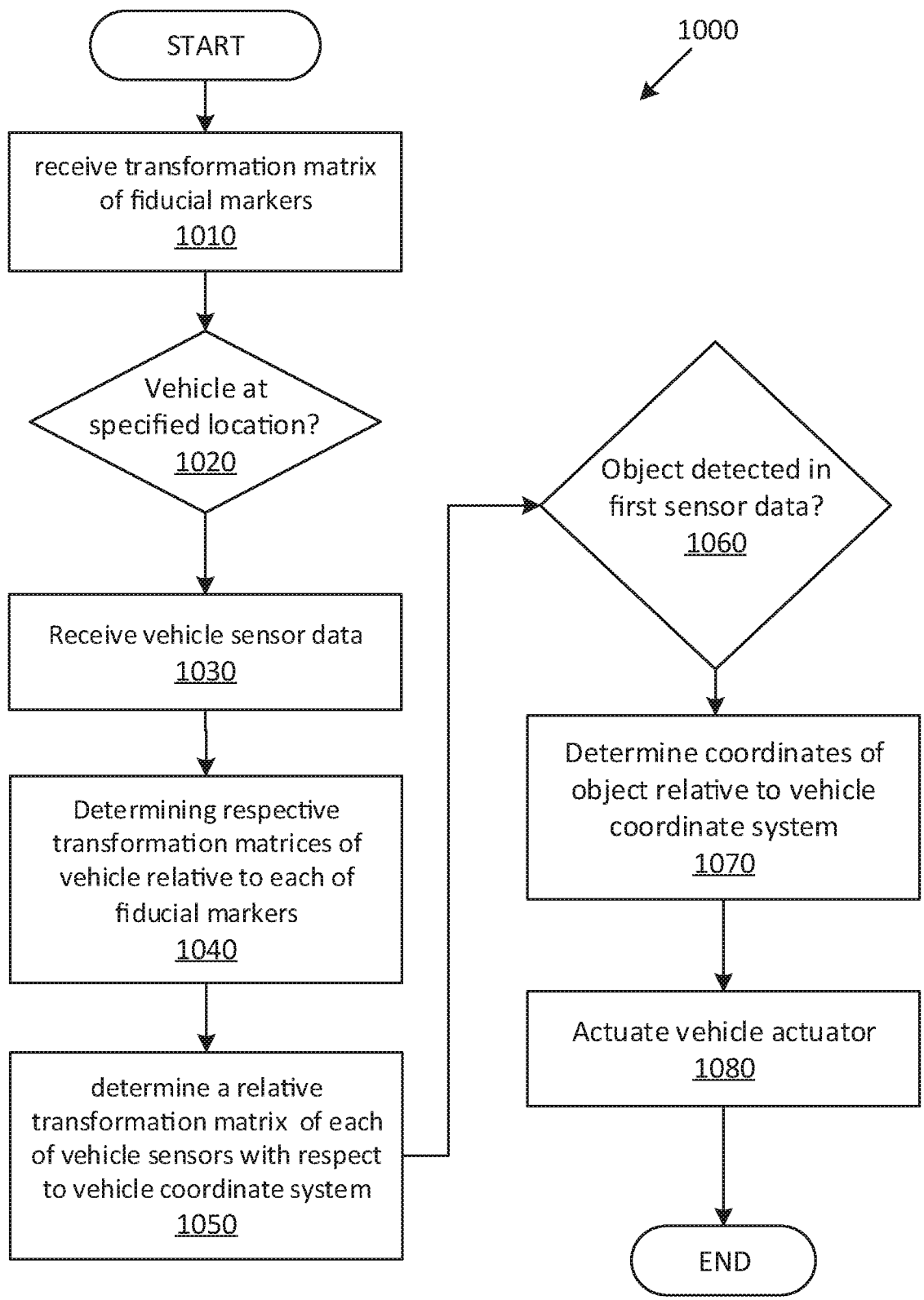
FIG. 10 is a flowchart of an example process for performing extrinsic calibration of vehicle camera sensors based on fiducial markers at a specified location, and operating the vehicle.

FIG. 10 illustrates a flowchart of a process 1000 for performing extrinsic calibration of vehicle 100 sensors 130 using fiducial markers 810 located in the fields of view 140 of vehicle 100 sensors 130. The computer 110 may be programmed to execute blocks of the process 1000.

The process 1000 begins in a block 1010, in which the computer 110 receives transformation matrix, $T_W{}^1$, of fiducial markers 810 (Table 1).

Next, in a block 1020, the computer 110 determines whether the vehicle 100 is located at a specified location 800 (such as described above with respect to FIG. 8). The computer 110 may be programmed to determine that the vehicle 100 is at the specified location 800 based on data received from a remote computer, a vehicle 100 sensor 130, etc. If the computer 110 determines that the vehicle 100 is at the specified location 800, then the process 800 proceeds to a block 1030; otherwise the process 1000 returns to the block 1020, or alternatively returns to the block 1010, although not shown in FIG. 10.

In the block 1030, the computer 110 receives image data from the vehicle 100 camera sensors 130 with non-overlapping fields of view 140. The received image data from each of the sensors 130 include image data of at least a fiducial marker 810 located within the field of view 140 of the respective sensor 130.

Next, in a block 1040, the computer 110 determines respective transformation matrices of the vehicle 100 relative to each of fiducial markers 810, e.g., the transformation matrix $T_1{}^{C_1}$ of the first camera sensor 130 relative to a first marker 180.

Next, in a block 1050, the computer 110 determines a relative transformation matrix of each of vehicle sensors with respect to vehicle 100 coordinate system. For example, the computer 110 may be programmed to implement Equations (4)-(8) to determine a transformation matrix $T_{C_4}{}^{C_1}$ of $x^{th}$ camera sensor 130 to $y^{th}$ camera sensor 130.

Next, in a decision block 1060, the computer 110 determines whether an object 170 is detected in first sensor 130 data (as discussed concerning FIG. 8). If the computer 110 determines that the object 170 is detected in the field of view 140 of the first sensor 130, the process 1000 proceeds to a block 1070; otherwise returns to the decision block 1060, or alternatively ends, although not shown in FIG. 10.

In the block 1070, the computer 110 determines coordinates t and/or pose R of object 170 relative to vehicle 100 coordinate system. The computer 110 may be programmed, based on Equation (3), to determine the transformation matrix $T_{C_2}{}^O$ of the object 170 within first sensor 130 field of view relative to the coordinate system 160D of the second sensor 130.

Next, in a block 1080, the computer 110 actuates a vehicle 100 actuator 120 based on the determined transformation matrix $T_{C_2}{}^O$. The computer 110 may be programmed to actuate a brake, steering, and/or propulsion actuator 120 based on the detected object 170.

Following the block 1080, the process 1000 ends, or alternatively returns to the block 1010, although not shown in FIG. 10.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computing device, comprising a processor and a memory, the memory storing instructions executable by the processor to:
   generate a plurality of raw 3D point clouds from respective sensors having non-overlapping fields of view;
   scale each of the raw point clouds including scaling real-world dimensions of one or more features included in the respective raw 3D point cloud;
   determine a first transformation matrix that transforms a first coordinate system of a first scaled 3D point cloud of a first sensor to a second coordinate system of a second scaled 3D point cloud of a second sensor;
   determine a second transformation matrix that transforms a third coordinate system of a third scaled 3D point cloud of a third sensor to the second coordinate system of the second scaled 3D point cloud of the second sensor;
   based on the first and second transformation matrices, upon detecting an object in a first or third camera field of view, determine location coordinates of the object relative to a coordinate system that is defined based on the second coordinate system; and
   output the determined location coordinates of the object.

2. The computing device of claim 1, wherein the instructions further include instructions to generate the raw 3D point clouds by applying monocular visual odometry technique to image data received from the respective sensor.

3. The computing device of claim 1, wherein each of the plurality of 3D point clouds is generated based on data received from one of a plurality of sensors.

4. The computing device of claim 1, wherein the one or more features include at least one of a lane marking, a guardrail, a traffic sign, and a traffic light, and wherein the real-world dimensions are determined based on at least one of (i) received HD map data or (ii) a set of specified dimensions including distances between two or more road markings, and dimensions of the traffic sign.

5. The computing device of claim 1, wherein the instructions further include instructions to determine the first transformation matrix by matching one or more features between the first and second 3D point clouds from the plurality of scaled 3D point clouds, thereby determining a first sensor pose relative to a second sensor pose; the second coordinate system defined based on the second sensor pose.

6. The computing device of claim 1, wherein the instructions further include instructions to determine the second transformation matrix by matching one or more features between the third scaled 3D point cloud and the second scaled 3D point clouds from the plurality of raw 3D point clouds, thereby generating a third sensor pose relative to the second sensor pose; the second coordinate system defined based on the second sensor pose.

7. A computing device, comprising a processor and a memory, the memory storing instructions executable by the processor to:

receive a transformation matrix of each of a plurality of stationary fiducial markers at a plurality of locations;

based on receiving image data from each of a plurality of sensors, each image including image data including at least one of the fiducial markers, determine respective transformation matrices of a vehicle relative each of the fiducial markers, wherein each of the sensors is included on the vehicle and wherein the sensors have non-overlapping fields of view;

determine a relative transformation matrix of each of the sensors with respect to a vehicle coordinate system having an origin at a vehicle reference point;

upon receiving the image data including an object from at least one of the sensors, determine transformation matrix of the object relative to the vehicle coordinate system; and actuate a vehicle actuator based on the object.

8. The computing device of claim 7, wherein the instructions further include instructions to determine the relative transformation matrix of each of the sensors with respect to the vehicle coordinate system by performing a pose concatenation.

9. The computing device of claim 7, wherein the received transformation matrix of each of a plurality of stationary fiducial markers at a plurality of locations are defined relative to a second coordinate system outside the vehicle, and each pose includes roll, pitch, yaw, lateral, longitudinal, and elevation coordinates.

10. The computing device of claim 7, wherein each of the fiducial markers is an Aruco marker.

11. The computing device of claim 7, wherein the instructions further include instructions to determine transformation matrix of the object relative to a coordinate system that is defined based on a second coordinate system by performing a pose concatenation, wherein the pose concatenation is a result of a matrix dot product operation on a first matrix specifying object coordinates relative to a first camera and a second transformation matrix specifying a pose and coordinates of the first camera relative to the second coordinate system.

12. A method, comprising:

generating a plurality of raw 3D point clouds from respective sensors having non-overlapping fields of view;

scaling each of the raw point clouds including scaling real-world dimensions of one or more features included in the respective raw 3D point cloud;

determining a first transformation matrix that transforms a first coordinate system of a first scaled 3D point cloud of a first sensor to a second coordinate system of a second scaled 3D point cloud of a second sensor;

determining a second transformation matrix that transforms a third coordinate system of a third scaled 3D point cloud of a third sensor to the second coordinate system of the second scaled 3D point cloud of the second sensor;

based on the first and second transformation matrices, upon detecting an object in a first or third camera field of view, determining location coordinates of the object relative to a coordinate system that is defined based on the second coordinate system; and outputting the determined location coordinates of the object.

13. The method of claim 12, further comprising generating the raw 3D point clouds by applying monocular visual odometry technique to image data received from the respective sensor, wherein each of the plurality of 3D point clouds is generated based on data received from one of a plurality of sensors.

14. The method of claim 12, wherein the one or more features include at least one of a lane marking, a guardrail, a traffic sign, and a traffic light, and wherein the real-world dimensions are determined based on at least one of (i) received HD map data or (ii) a set of specified dimensions including distances between two or more road markings, and dimensions of the traffic sign.

15. The method of claim 12, further comprising determining the first transformation matrix by matching one or more features between the first and second 3D point clouds from the plurality of scaled 3D point clouds, thereby determining a first sensor pose relative to a second sensor pose; the second coordinate system defined based on the second sensor pose.

16. The method of claim 12, further comprising determining the second transformation matrix by matching one or more features between the third scaled 3D point cloud and the second scaled 3D point clouds from the plurality of raw 3D point clouds, thereby generating a third sensor pose relative to the second sensor pose; the second coordinate system defined based on the second sensor pose.

* * * * *